Aug. 22, 1939.   C. W. SINCLAIR   2,170,666
WHEEL
Filed June 17, 1935   3 Sheets-Sheet 2
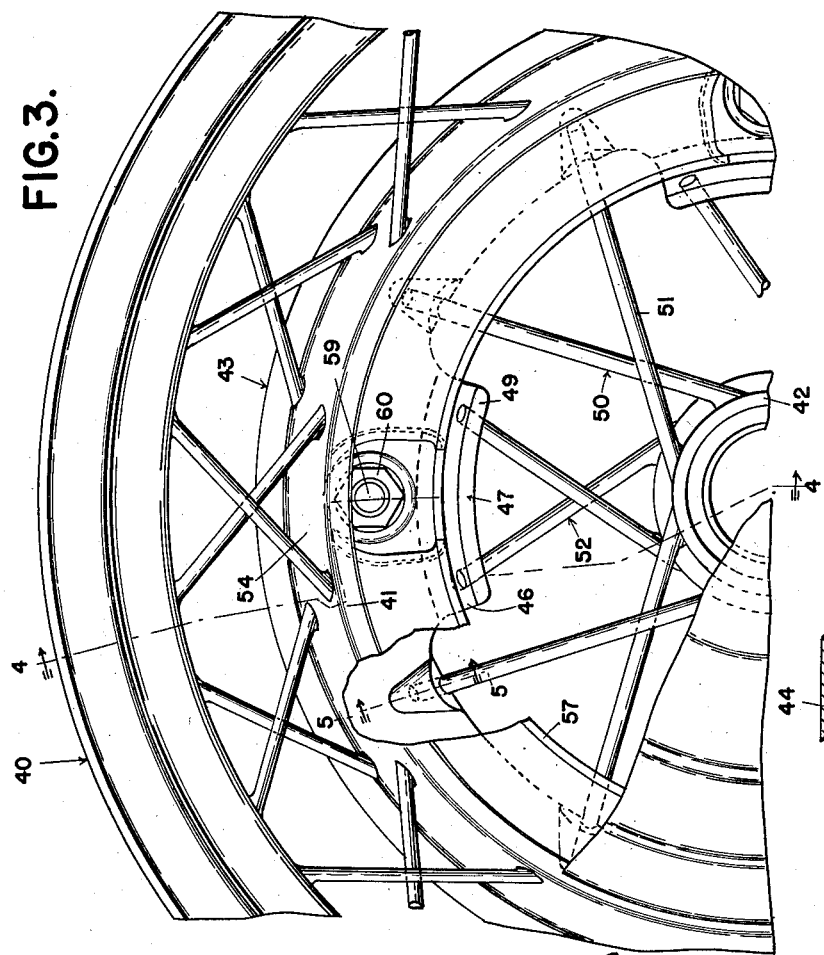
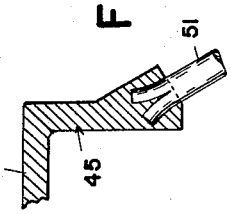
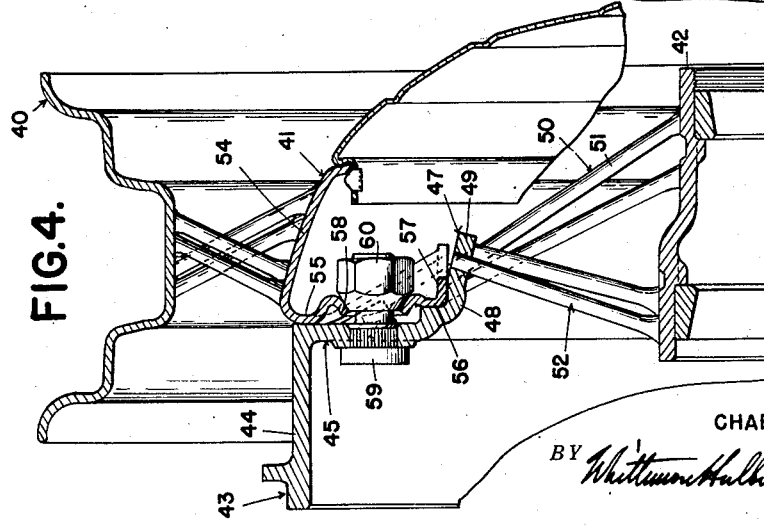
INVENTOR
CHARLES W. SINCLAIR
BY
ATTORNEYS Aug. 22, 1939.　　　C. W. SINCLAIR　　　2,170,666
WHEEL
Filed June 17, 1935　　　3 Sheets-Sheet 3

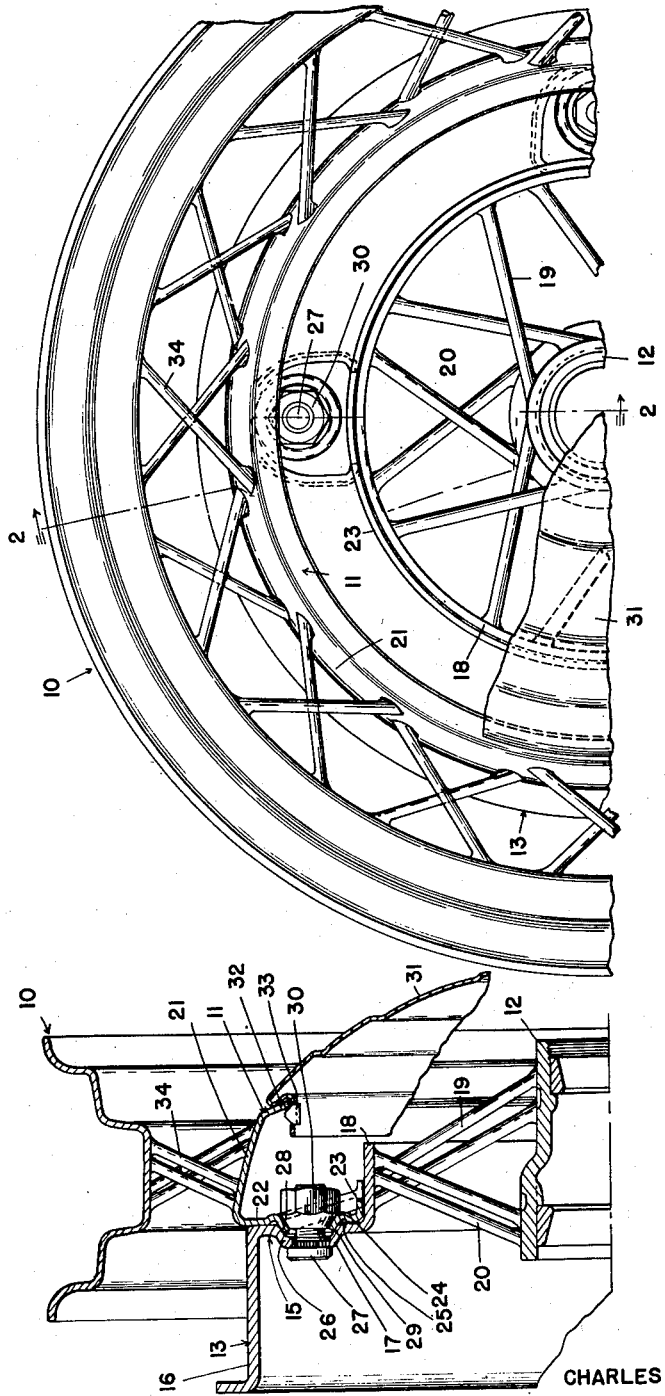

INVENTOR
CHARLES W. SINCLAIR
BY
ATTORNEYS

Patented Aug. 22, 1939

UNITED STATES PATENT OFFICE 2,170,666

WHEEL

Charles W. Sinclair, Detroit, Mich., assignor to Kelsey-Hayes Wheel Company, Detroit, Mich., a corporation of Delaware Application June 17, 1935, Serial No. 27,075

11 Claims. (Cl. 301—6)

This invention relates generally to wheels, and refers more particularly to vehicle wheels of the type embodying a wheel body element mounted on the brake drum of the wheel assembly.

Mounting the wheel body upon the brake drum is desirable in that it not only renders it possible to economize on material, but, also offers the possibility of reducing the weight and cost of the wheel assembly. However, in order to obtain a commercially satisfactory wheel assembly embodying the above features, it is necessary to solve the problem of preventing distortion of the brake engaging surface by the stresses resulting from the radial and axial loads applied to the rim of the wheel during operation. The present invention contemplates solving this problem by a wheel assembly so constructed that the reactions resulting from both radial and axial loads on the rim are so effectively taken by the load carrying member of the assembly, as to prevent deformation of the brake flange of the drum.

Another object of the present invention resides in the provision of a wheel assembly having a brake drum comprising a web having a portion supporting the wheel body and having another portion connecting the portion aforesaid to the inner hub of the wheel assembly, and constructed to effectively withstand the stresses transmitted by the wheel body element.

Still another advantageous feature of this invention resides in the provision of a wheel body including a hub shell having a radially inwardly extending attaching flange at the rear end secured to the front side of the web of the brake drum adjacent the periphery of the latter and having an axially forwardly extending annular flange at the inner end of the attaching flange seated upon the web of the brake drum.

A further object of the present invention consists in the provision of a vehicle wheel assembly having a hub shell provided with a radially extending attaching flange secured to the web of the brake drum of the assembly and having an axially forwardly extending flange for supporting the spokes of the wheel in advance of the plane of the radially extending flange aforesaid.

A still further object of this invention consists in the provision of a brake drum having a web provided with a forwardly extending wheel body positioning flange encircling the inner hub of the wheel and connected to the latter, through the medium of spokes constructed and arranged to resist both radial and axial stresses imparted thereto by the wheel body.

Still another advantageous feature of the present invention resides in the provision of a brake drum having a web provided with a radially inwardly extending portion connected to the inner hub of the wheel assembly by a series of spokes and terminating in an axially forwardly extending wheel body supporting portion connected to the inner hub, through the medium of another series of spokes cooperating with the series aforesaid to effectively withstand the stresses transmitted by the wheel body, without deforming the brake flange of the drum.

In addition to the foregoing, the present invention contemplates a vehicle wheel having a cast brake flange and hub unit interconnected through the medium of a wheel body supporting web reinforced to effectively dissipate the stresses resulting from wheel loads, without deforming the flange.

The foregoing, as well as other objects, will be made more apparent as this description proceeds, especially when considered in connection with the accompanying drawings, wherein:

Figure 1 is a fragmentary front elevational view of a vehicle wheel constructed in accordance with this invention and showing a portion of the cover plate broken away for the sake of clearness;

Figure 2 is a sectional view taken substantially on the plane indicated by the line 2—2 of Figure 1;

Figure 3 is a view similar to Figure 1 of a slightly modified form of construction;

Figure 4 is a sectional view taken substantially on the plane indicated by the line 4—4 of Figure 3;

Figure 5 is a fragmentary sectional view taken substantially on the plane indicated by the line 5—5 of Figure 3;

Figure 6:
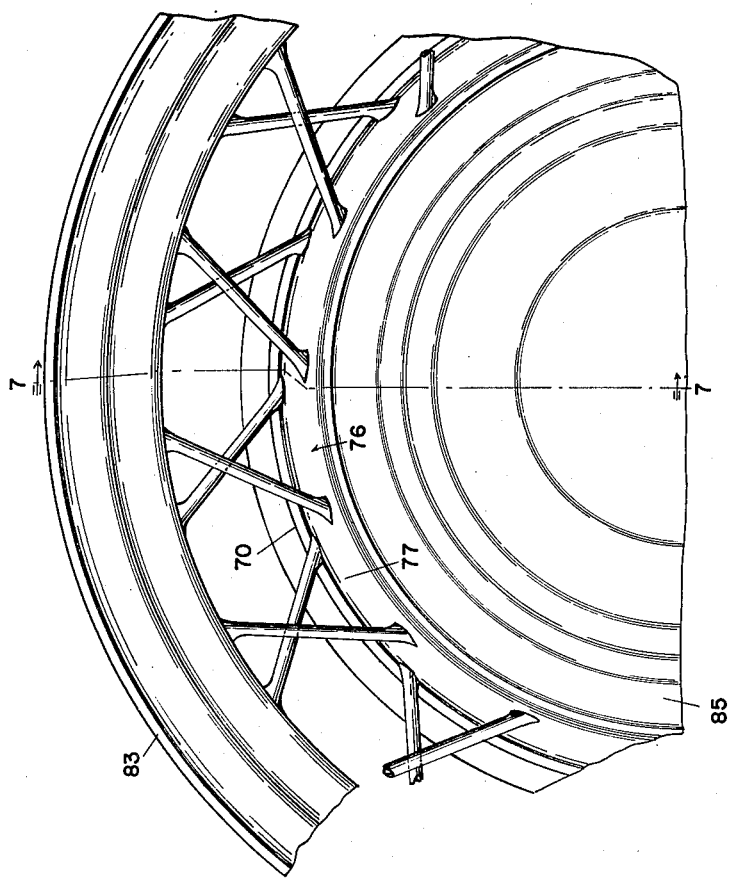
Figure 6 is a fragmentary front elevational view of still another modified form of wheel construction.

Referring now more in detail to the drawings, and with special reference to the embodiment featured in Figures 1 and 2, it will be noted that the wheel assembly illustrated by both of these figures, comprises a tire carrying rim 10, a hub shell 11, an inner hub 12 and a brake drum 13. The brake drum 13 may be formed in any suitable manner from sheet metal and comprises a web 15 having an axially rearwardly extending annular brake flange 16 at the periphery thereof. Upon reference to Figure 2, it will be noted that the web 15 is provided with a forwardly inclined attaching portion 17 having an axially forwardly extending flange 18 at the inner edge thereof forming a pilot for guiding the wheel body element or hub shell 11 into position adjacent the portion 17 for attachment thereto. The flange 18 is connected to the inner hub 12 through the medium of a series of front wire spokes 19 and a series of rear wire spokes 20 arranged to cooperate with each other in transferring the stresses resulting from both radial and axial loads on the rim 10 of the wheel, to the inner hub, in such a manner that these stresses will have little, if any, tendency to deform the brake flange 16 of the drum. It will be understood that the extremities of the wire spokes may be respectively secured to the flange 18 and inner hub 12 in any suitable manner. In the present instance, the inner extremities of the front series of spokes 19 are welded to the inner hub adjacent the forward end thereof, and are inclined in a rearward direction with the outer ends thereof welded to the flange 18. The inner extremities of the rear series of spokes, on the other hand, are welded to the inner hub 12 adjacent the rear end thereof, and are inclined in a forward direction with the outer extremities welded to the flange 18. By reference to Figure 1, it will be noted that the front series of spokes are arranged in pairs with the spokes of each pair crossing each other, while the rear series of spokes are arranged in pairs located between the pairs of the front series of spokes, and also crossing each other. Although this specific arrangement may be varied, nevertheless, it is preferred since it is highly effective to transmit the stresses resulting from the wheel loads to the inner hub 12, without deforming the brake flange 16.

As previously stated, the hub shell 11 is secured to the attaching portion 17 of the brake drum web and, in the present instance, the hub shell comprises an annular body portion 21 encircling the flange 18 and having an inwardly extending flange 22 at the rear end adapted to abut the web 15 of the brake drum adjacent the periphery thereof. As will be observed from Figure 2, the portion of the flange 22 extending inwardly from the point of engagement thereof with the web 15, is disposed parallel to the forwardly inclined portion 17 of the brake drum web 15 and terminates in a forwardly extending axial flange 23 cooperating with the pilot 18 to position the wheel on the brake drum. It will also be noted from Figure 2, that the inclined portion of the flange 22 on the hub shell, is offset or pressed inwardly at spaced points in the manner designated by the reference character 24, and the offset portions are adapted to engage in suitable pockets 25 formed by offsetting or pressing the inclined portion 17 rearwardly at corresponding points. The wall 26 of each of the pockets 25 in the brake drum web is apertured to receive a bolt 27, and the portions of the walls surrounding the apertures are formed to provide frusto conical seats 28. The offset portions of the attaching flange 22 of the hub shell are provided with aligned openings for receiving the threaded shanks of the bolts, and the portions of the flange surrounding the openings are also fashioned to provide frusto conical seats 29 adapted to engage the seats 28. In the present instance, the frusto conical seats are held in engagement with each other by means of the nuts 30 threaded upon the forward extremities of the bolts 27, and accessible for manipulation through the front side of the hub shell 11.

Thus from the foregoing, it will be observed that the hub shell is accurately positioned upon the brake drum by sleeving the annular flange 23 on the shell over the pilot flange 18 on the web 15 of the brake drum, and also that the hub shell is demountably secured to the web 15 of the brake drum by fastening means located within the shell. It may also be pointed out that the inclination of the portion 17 of the brake drum web 15 materially strengthens the web and permits the same to transmit the radial, as well as the axial loads, to the inner hub 12 through the wire spokes previously referred to, without deforming the brake flange.

In order to avoid the expense of finishing the construction within the hub shell 11 and, at the same time, enhance the general appearance of the wheel, I provide a cover plate or a hub cap 31 adapted to be secured to the forward end of the shell 11. In the present instance, the forward end of the shell is provided with an inwardly extending nose 32 and the hub cap 31 carries means 33 adapted to snap into engagement with the nose.

The rim 10 of the wheel encircles the hub shell and is secured to the latter in advance of the demountable fastening means therefor, by means of spokes 34. In the specific illustrated embodiment of the invention, the spokes 34 are shown as being constructed and arranged in the same manner as the spokes 19 and 20. Attention is specifically called to the fact, however, that the inner extremities of the spokes 34 are secured to the body portion 21 of the hub shell 11 in advance of the attaching flange 22, and that due to the relatively large diameter of the body portion, as compared to the internal diameter of the rim, these spokes may be relatively short affecting a saving in material, weight and cost of manufacture.

In the embodiment of the invention illustrated in Figures 3 to 5 inclusive, the wheel also comprises a rim 40, a hub shell 41, an inner hub 42 and a brake drum 43. The brake drum in the present instance, however, is shown as being of a cast construction having a brake flange 44 and a web 45. By reference to Figure 3, it will be noted that the web 45 comprises circumferentially spaced inwardly projecting extensions 46 terminating in axially forwardly extending flanges 47 concentrically disposed with respect to the axis of the inner hub. By reference to Figure 4, it will be noted that the flanges 47 are provided with portions 48 adjacent the extensions 46 forming a seat for the hub shell 41, and are provided with additional portions 49 at the extremities tapered inwardly in order to form a pilot for the hub shell 41. In the present embodiment of the invention, the brake drum is also supported from the inner hub through the medium of wire spokes 50 having the outer extremities preferably cast integral with the drum and having the inner extremities welded or otherwise suitably secured to the inner hub 42. In detail, the front series of spokes 51 are inclined rearwardly from the forward end portion of the inner hub, and the outer extremities thereof are welded to the inner edge of the portion of the brake drum web 45 extending between the extensions 46. The rear series of spokes 52 incline forwardly from the rear end portion of the inner hub, and the outer extremities thereof are preferably cast into the pilot portion 49 of the flange 47. As will be observed from Figure 4, the arrangement is such that the hub shell is seated upon the flange 47 axially between the outer extremities of the two series of spokes, with the result that both the radial and axial wheel loads are effectively transferred to the inner hub 42 without placing undue stress upon the brake flange 44. In this connection, it may be pointed out that the front series of spokes 51 effectively support the brake drum 43 adjacent the flange 44, while the rear series of spokes effectively support the flange 47 upon the inner hub.

The hub shell 41 is provided with an annular body portion 54 having a mean diameter approximating the diameter of the brake flange 44 and having an inwardly extending attaching flange 55 at its rear end engaging the front side of the brake drum adjacent the periphery thereof. As in the first described form of the invention, the portion of the attaching flange 55 spaced inwardly from the point of engagement thereof with the brake drum, is inclined forwardly and is offset or depressed rearwardly at spaced points to engage the portions 56 with the front side of the web 45 of the brake drum, and to also provide axially forwardly extending portions 57 adapted to seat upon the portion 48 of the flange 47. Each of the portions 56 of the attaching flange 55 is apertured in alignment with corresponding openings formed in the web 45 of the brake drum radially outwardly beyond the flanges 47, and the portions of the attaching flange 55 surrounding the openings therethrough are fashioned to provide frusto conical flanges 58 adapted to engage corresponding surfaces on the nuts 60 threaded upon the forward extremities of the bolts 59.

From the foregoing, it will be observed that the pilot 47 on the brake drum serves to readily position the hub shell with the axial portions 57 in engagement with the seats 48 on the brake drum, and also that the shell is demountably secured to the drum by means of fastener elements accessible for manipulation through the front side of the hub shell. It will further be apparent that the wheel loads transmitted to the brake drum by the hub shell are effectively taken by the spokes 50 and transferred to the inner hub 42.

As in the first described form of the invention, the portions of the wheel assembly within the hub shell are concealed by a cover plate or hub having a snap engagement with the nose of the shell. This construction not only enhances the appearance of the wheel, but, at the same time, renders it unnecessary to perform the expensive finishing operations on the parts of the wheel concealed thereby.

The rim 40 of the wheel may be secured to the hub shell 41, in the same manner as hereinbefore described in connection with the first embodiment of this invention, and, accordingly, the detailed description of this construction will not be repeated in connection with this embodiment of the invention.

Figure 7:
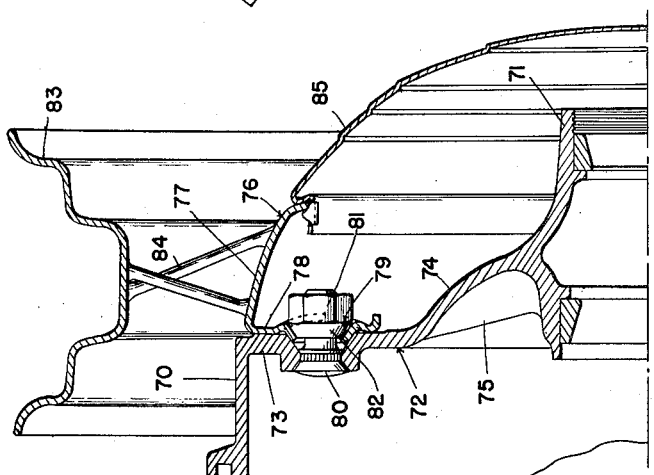
Figure 7 is a sectional view taken substantially on the plane indicated by the line 7—7 of Figure 6.

In the embodiment of the invention illustrated in Figures 6 and 7, the brake drum and hub of the wheel are shown as cast in one piece. By reference to Figure 7, it will be noted that the brake drum is provided with an annular brake flange 70 integrally connected to the inner hub 71 through the medium of a web 72 having a radial portion 73 adjacent the brake flange and having a forwardly extending curved portion 74 merging into the hub 71 intermediate the ends thereof. The portion 74 is reinforced by ribs 75 extending rearwardly from the curved portion 74 and integrally connected at the inner ends to the rear end portion of the inner hub 71. As in the foregoing embodiments of the invention, the wheel body is mounted upon the web 72 and this web is so designed and so ribbed as to effectively transfer the wheel loads to the inner hub 71 without the danger of deforming the brake flange 70.

The wheel body is demountably secured to the brake drum and includes a hub shell 76 having an annular body portion 77 encircling the inner hub 71. As shown in Figure 7, the rear end of the body portion 77 is provided with an inwardly extending attaching flange 78 adapted to abut the front side of the radial portion 73 of the web 72 and having circumferentially spaced openings 79 therethrough to provide for extending the threaded portions of the bolts 80 through the attaching flange. The bolts 80 are provided with head portions permanently secured in the web 72 of the brake drum in any suitable manner, and having threaded portions adapted to extend through the openings 79 in the flange 78 to detachably receive the clamping nuts 81. It will be observed from Figure 7, that the portions of the attaching flange 78 surrounding the openings 79 are fashioned to provide frusto conical rearwardly extending projections adapted to be clamped to correspondingly shaped surfaces on the web 72 by the frusto conical portions 82 of the clamping nuts 81.

The rim 83 of the wheel is connected to the annular body portion 77 of the hub shell 76 in advance of the attaching flange 78, by means of wire spokes 84 arranged in any suitable manner. As in both of the above described forms of the invention, the spokes are relatively short, due to the fact that the hub shell is of a large diameter, as compared to the internal diameter of the rim, and this not only provides for increasing the strength of the wheel, but, also renders it possible to reduce the cost of manufacture thereof.

By referring again to Figure 7, it will be noted that the demountable fastening means and remaining portion of the wheel assembly located inwardly of the hub shell, are concealed by a cover or hub cap 85 fashioned to have a snap engagement with the nose on the forward end of the shell.

Although several specific embodiments of the invention have been described in detail herein, nevertheless, it will be noted that in each of the constructions, a wheel body element in the form of a hub shell is demountably secured to the brake drum having an annular brake flange supported from the inner hub of the wheel assembly, in such a manner as to effectively transfer both the axial and radial wheel loads to the inner hub, without placing undue stress upon the brake flange. It will also be noted that in each embodiment of the invention specifically described herein, the spokes connecting the rim of the wheel with the hub shell are anchored to the annular body portion of the latter in advance of the attaching flange. However, attention is directed to the fact that insofar as the mounting of the wheel body element on the brake drum is concerned, it is immaterial whether the wheel body is of the wire spoked type or of any one of the various other types and, therefore reservation is made to make such changes as may come within the purview of the accompanying claims.

What I claim as my invention is:

1. In a vehicle wheel assembly, a hub, a brake drum having an annular brake flange and having a web, said web having a central opening therethrough for receiving the hub and having an annular flange extending axially forwardly from the marginal edges of the opening, means connecting the forwardly extending flange to the hub at points spaced axially on the latter, and a wheel body element positioned in engagement with the front side of the web by the annular forwardly extending flange and demountably secured to said web.

2. In a vehicle wheel assembly, a hub, a brake drum having an annular brake flange and having an inwardly extending web at the forward end of the flange, said web having a central opening therethrough for receiving the hub and having an annular flange extending axially forwardly from the marginal edges of the opening, wire spokes connecting the forwardly extending flange to the hub at points spaced axially on the latter, and a wheel body element positioned in engagement with the front side of the web of the brake drum by the annular forwardly extending flange aforesaid and demountably secured to said web.

3. In a vehicle wheel assembly, a hub, a brake drum having an annular flange and having a web extending inwardly from the forward end of the annular flange provided with a forwardly extending annular flange encircling the hub, means connecting the forwardly extending flange to the hub including, a series of front spokes arranged in pairs and inclined rearwardly from the forward end portion of the hub to the annular forwardly extending flange and a series of rear spokes also arranged in pairs between the pairs of front spokes and inclined forwardly from the rear end portion of the hub to the annular forwardly extending flange on said web.

4. In a vehicle wheel assembly, a hub, a brake drum having an annular flange and having a web extending inwardly from the forward end of the annular flange, said web having a central opening therethrough for receiving the hub and having an extending annular flange extending axially forwardly from the marginal edges of said opening, means connecting the forwardly extending annular flange to the hub at points spaced axially on the latter, a hub shell having an annular body portion and having an attaching flange extending inwardly from the rear end of the body portion and positioned in engagement with the front side of the web of the brake drum by the forwardly extending annular flange on the web of the brake drum, means demountably securing the attaching flange of the shell to the web of the drum, and a closure removably secured to the front end of the shell concealing the hub member and connection between the latter and brake drum.

5. In a vehicle wheel assembly, a hub member, a brake drum having an annular brake flange and having a web extending inwardly from the front end of the brake flange provided with forwardly extending portions encircling the hub member, means connecting the forwardly extending portions to the hub member, and additional means connecting the web of the brake drum to the hub member, and a wheel body element supported upon the forwardly extending portions between the means aforesaid.

6. In a vehicle wheel, a hub member, a brake drum having an annular brake flange and having a web extending inwardly from the front end of the brake flange provided with forwardly extending portions encircling the hub, means connecting the forward end portions adjacent their extremities to the hub member, means connecting the web of the brake drum between said portions to the hub member at a point spaced axially of the hub member from the point of connection of the first named means with the hub member, and a wheel body element supported upon the forwardly extending portions between the points of connection of the first named means with said portions and the points of connection of the second named means with the web.

7. In a vehicle wheel assembly, a hub member, a brake drum having an annular brake flange and having a web extending inwardly from the front end of the flange provided with circumferentially spaced forwardly extending portions encircling the hub, a series of spokes connecting the forwardly extending portion to the hub member, a second series of spokes connecting the web of the brake drum between the portions aforesaid to the hub member, and a wheel body element supported upon the forwardly extending portions between the outer extremities of the two series of spokes.

8. In a vehicle wheel assembly, a hub member, a brake drum having an annular brake flange and having a web extending inwardly from the front end of the brake flange provided with axially forwardly extending circumferentially spaced portions inclined inwardly at the extremities thereof to form pilots for guiding a wheel body element to a position on the forwardly extending portions, means connecting the forwardly extending portions to the hub member, and means carried by the web of the brake drum radially outwardly from the forwardly extending portions for demountably securing a wheel body element to the web of the brake drum.

9. In a vehicle wheel assembly, a hub member, a brake drum having an annular brake flange and having a web extending inwardly from the front end of the flange provided with forwardly extending circumferentially spaced wheel body supporting portions, a series of spokes connecting said portions to the hub member adjacent the rear end thereof, and a second series of spokes connecting the web of the brake drum between said portions to the hub member adjacent the forward end thereof.

10. In a vehicle wheel assembly, a hub member, a brake drum having an annular brake flange and having a web provided with an axially forwardly extending portion connected to the hub member, a wheel body element having a radially inner portion seated on the axially forwardly extending portion of the web and having a portion extending radially outwardly adjacent the front side of the web and terminating in a forwardly extending tire rim supporting portion, means for demountably securing the radially outwardly extending portion of the wheel body element to the web of the brake drum between the forwardly extending portion of the wheel body element and the radially inner edge of the latter, and a cover plate removably secured to the forwardly extending portion of the wheel body element.

11. In a vehicle wheel assembly, a hub member, a brake drum having an annular brake flange and having a web provided with axially forwardly extending circumferentially spaced portions inclined inwardly at the extremities thereof to form pilots for guiding a wheel body element to a position in seating relation to the forwardly extending portions adjacent the front side of the web of the brake drum, a connection between the forwardly extending portions and the hub member, and means demountably securing the wheel body element to the web of the brake drum at points spaced radially outwardly from the forwardly extending portion of the web.

CHARLES W. SINCLAIR.